United States Patent [19]

Nagamine et al.

[11] Patent Number: 5,570,433
[45] Date of Patent: Oct. 29, 1996

[54] APPARATUS AND METHOD FOR DEFOCUSING IMAGES

[75] Inventors: Satoshi Nagamine, Yamatotakada; Kiyoshi Maenobu, Amagasaki; Yorihiko Wakayama, Katano; Akio Nishimura, Sakai, all of Japan

[73] Assignee: Matsushita Electric Industrial Co., Ltd., Osaka, Japan

[21] Appl. No.: 542,543

[22] Filed: Oct. 13, 1995

Related U.S. Application Data

[63] Continuation of Ser. No. 190,261, Feb. 2, 1994, abandoned.

[30] Foreign Application Priority Data

Feb. 2, 1993 [JP] Japan .................... 5-015202

[51] Int. Cl.⁶ ................ G06K 9/40; G01J 1/20; G03B 3/00; G02B 15/14
[52] U.S. Cl. .............. 382/255; 250/201.2; 359/698; 348/345; 348/347; 348/349; 396/125
[58] Field of Search ............... 250/201.1, 201.2, 250/201.4; 382/255; 359/698; 354/402, 195.11, 200; 351/205; 348/345, 347, 348, 349, 350

[56] References Cited

U.S. PATENT DOCUMENTS

| | | | |
|---|---|---|---|
| 5,063,375 | 9/1989 | Lien et al. | 345/136 |
| 5,144,456 | 1/1990 | Sakano | 358/443 |
| 5,212,516 | 5/1993 | Yamada et al. | 354/402 |
| 5,233,472 | 8/1993 | Havaguchi et al. | 348/347 |
| 5,281,796 | 1/1994 | Kaneda et al. | 250/201.2 |

FOREIGN PATENT DOCUMENTS

| | | | |
|---|---|---|---|
| 63-014285 | 1/1988 | Japan | G06F 15/68 |
| 63-259778 | 10/1988 | Japan | G06F 15/72 |
| 3036678 | 2/1991 | Japan | G06F 15/72 |
| 4343584 | 11/1992 | Japan | G06F 15/72 |

OTHER PUBLICATIONS

Potmesil, Michael and Chakravarty, Indranil, "Synthetic Image Generation with a Lens and Aperture Camera Model", ACM, 1990, pp. 86–107.
ACM Transaction on Graphics, vol. 1, No. 2. Apr. 1982, pp. 85–108.

Primary Examiner—Jose L. Couso
Assistant Examiner—Matthew C. Bella
Attorney, Agent, or Firm—Price, Gess & Ubell

[57] ABSTRACT

The present invention discloses an image defocusing apparatus for defocusing an image formed on a screen by modeling an object in a boundary box by updating pixel values on the image to approximate a lens's focusing effects and a method thereof. The apparatus comprises a unit for computing data related to a circle of confusion for each point in the boundary box, the circle of confusion being a measure how defocused an out-of-focus point is on the screen, a unit for checking a reference pixel whose corresponding point's circle of confusion overlaps a pixel selected as a target pixel, and a unit for updating an original value of the target pixel by taking into account a value of the reference pixel and the data of the target pixel's circle of confusion.

50 Claims, 12 Drawing Sheets

(R,G,B)

| (16,0,0) | (16,0,0) | (16,0,0) | (16,16,16) | (16,16,16) | (16,16,16) | (16,16,16) |
|---|---|---|---|---|---|---|
| (16,0,0) | (16,0,0) | (16,0,0) | (16,16,16) | (16,16,16) | (16,16,16) | (16,16,16) |
| (16,0,0) | (16,0,0) | (16,0,0) | (16,16,16) | (16,16,16) | (16,16,16) | (16,16,16) |
| (16,0,0) | (16,0,0) | (16,0,0) | (16,16,16) | (16,16,16) | (16,16,16) | (16,16,16) |
| (16,0,0) | (16,0,0) | (16,0,0) | (16,16,16) | (16,16,16) | (16,16,16) | (16,16,16) |

↑
OBJECT'S EDGE

| 5 | 5 | 5 | 9 | 9 | 9 | 9 |
|---|---|---|---|---|---|---|
| 5 | 5 | 5 | 9 | 9 | 9 | 9 |
| 5 | 5 | 5 | 9 | 9 | 9 | 9 |
| 5 | 5 | 5 | 9 | 9 | 9 | 9 |
| 5 | 5 | 5 | 9 | 9 | 9 | 9 |

↑
OBJECT'S EDGE

| 0 | 0 | 0 | 3 | 3 | 3 | 3 |
|---|---|---|---|---|---|---|
| 0 | 0 | 0 | 3 | 3 | 3 | 3 |
| 0 | 0 | 0 | 3 | 3 | 3 | 3 |
| 0 | 0 | 0 | 3 | 3 | 3 | 3 |
| 0 | 0 | 0 | 3 | 3 | 3 | 3 |

↑
OBJECT'S EDGE

FIG. 7A

OBJECT'S EDGE
↓

| P00 | P01 | P02 | P03 | P04 | P05 |
|-----|-----|-----|-----|-----|-----|
| P10 | P11 | P12 | P13 | P14 | P15 |
| P20 | P21 | P22 | P23 | P24 | P25 |
| P30 | P31 | P32 | P33 | P34 | P35 |

FIG. 7B

| P03 | P04 |     |
|-----|-----|-----|
| P13 | P14 | P15 |
| P23 | P24 | P25 |
| P33 | P34 | P35 |

FIG. 11A
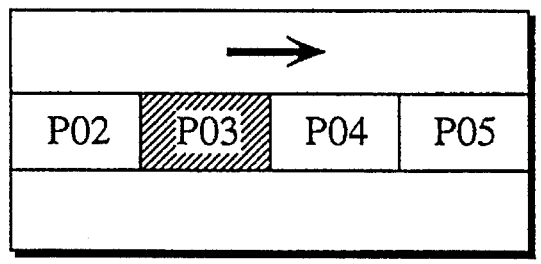
FIG. 11B
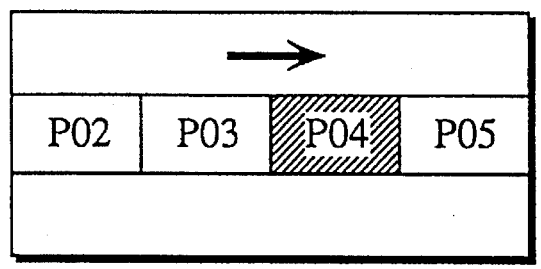
FIG. 11C
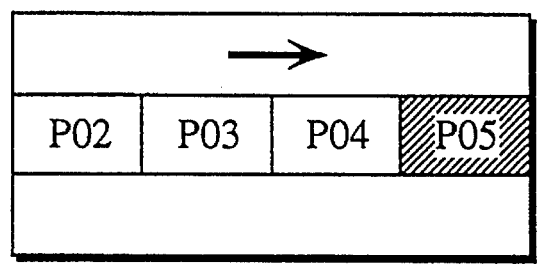
FIG. 12A       FIG. 12B       FIG. 12C
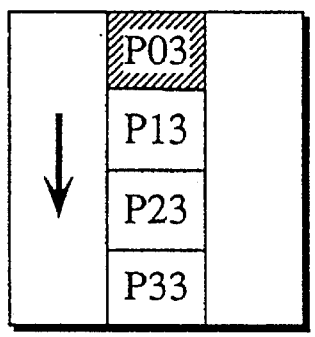 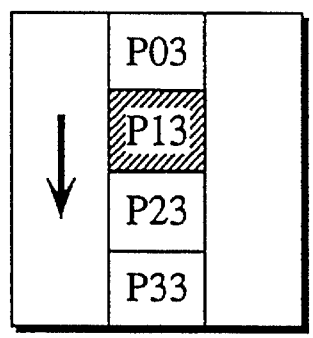 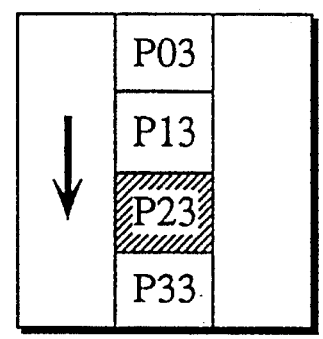

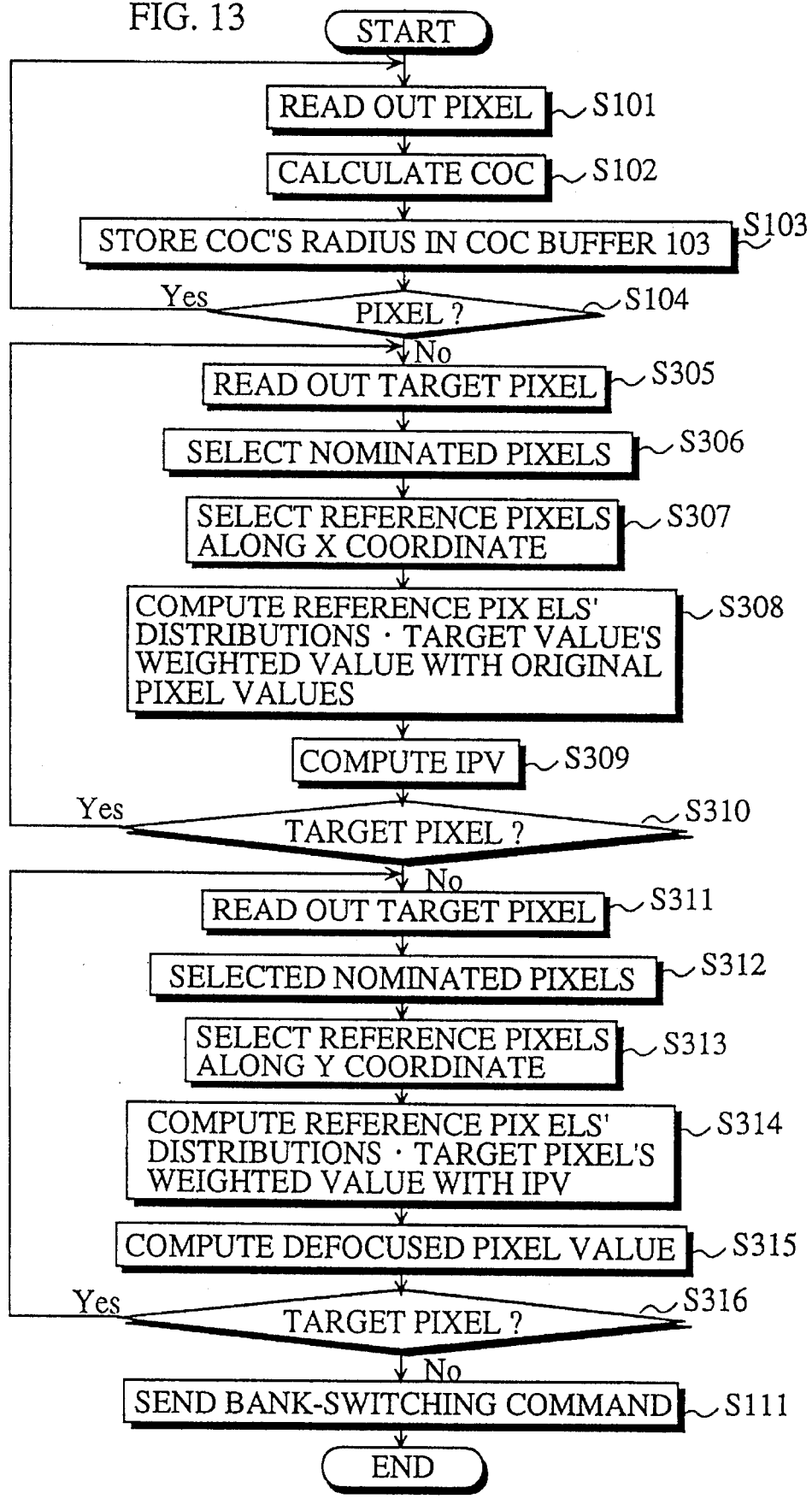

APPARATUS AND METHOD FOR DEFOCUSING IMAGES

This is a continuation of application Ser. No. 08/190,261, filed on Feb. 2, 1994, now abandoned.

BACKGROUND OF THE INVENTION

(1) Field of the Invention

The present invention relates to an image defocusing apparatus capable of simulating a real lens's focusing effects on an image formed by computer graphics, and to a method thereof.

(2) Description of the Related Art

The rapid progress in the field of computer graphics makes it possible to synthesize an image formed by the computer graphics into a video taken by a video camera. The synthetic image, however, will be unrealistic unless a proper depth distance is taken into account, for example, by a process called "defocusing".

With the "defocusing", an object in focus appears clear and sharp while the front and rear of the object, or out-of-focus points, are fuzzy and blurred thereby providing a resulting image in a similar manner as seen through a camera. (Rendering an image by modeling an object with a boundary box is a known art and the explanation thereof is omitted herein.)

Typically, a method called "ray-tracing" is used for the "defocusing". However, the "ray-tracing" or other applicable methods involve a considerable amount of computation, and thus the entire process takes quite a long time. To solve this problem, a simpler, faster method has been disclosed in Japanese Laid-Open Patent Application No. 63-259778. In this method, a region of defocus for each sample point is determined with their respective Z values that represent a distance from a view point to each sample point, and a focal point of a lens being used; the intensities within the region of defocus are averaged to update the original intensities with the mean intensity.

A more detailed explanation will be given by referring to FIG. 1, which shows the relation between the Z values and regions of defocus relative to the focal point. Here, a view point is fixed at z=0 coordinate, and several points, Za, Zb, Zc(focal point), Zd, and Ze, are fixed along the z coordinate, the direction in which an eye ray is aimed. Assume that Z is the z coordinate of the sample point, i.e., the Z value, then the region of defocus of the sample point is determined as follows:

| Conditions | Region of Defocus |
| --- | --- |
| 1) $Zd \geq Z > Zb$ | none |
| 2) $Ze \geq Z > Zd$ or $Zb \geq Z > Za$ | 3 × 3 |
| 3) $Z > Ze$ or $Za \geq Z$ | 5 × 5 |

In the drawing, a square 501 represents a pixel corresponding to the sample point, while squares 502, 503 the regions of defocus under the conditions 1), 2), respectively.

Given the region of defocus, either an arithmetic mean or a weighted mean of the intensities is computed, and the original intensities of all the pixels within the region of defocus are updated by the mean intensity. Since the area of the region of defocus is proportional to a distance from the focal point, a viewer can see the depth distance in the resulting defocused image.

By exploiting the mean intensity as has been described, the amount of the computation is reduced, but only at the expense of degradation in image quality.

For example, when a model shown in FIG. 2A—a red object with a white background placed in the boundary box—is rendered to an image shown in FIG. 2B and thence to a defocused image, the result will be the one shown in FIG. 2C.

This is because the mean intensity of the region of defocus a2 for the sample point a1 naturally includes the red intensity since a2 overlaps the pixels on the object's image. This causes the edge of the object to appear fuzzy and blurred, or the object to appear larger than it should in the image: a phenomenon that never occurs when seen through a camera. A similar phenomenon does occur even when the object is out of focus as long as there is the depth distance in the model.

SUMMARY OF THE INVENTION

Accordingly, the present invention has a first object to provide an image defocusing apparatus capable of distributing no intensity(pixel value) on an object to its background in a defocused image whether the object is in focus or out of focus, and capable of computing an intensity distribution without decreasing the speed realized to date.

The present invention has a second object to provide an image defocusing apparatus capable of forming the object's image of a size it should be in the defocused image.

The present invention has a third object to provide an image defocusing apparatus capable of approximating a real lens's focusing effects on the defocused image.

The present invention has a fourth object to provide an image defocusing apparatus capable of realizing a depth distance corresponding to the Z value given to each pixel in the defocused image.

The present invention has a fifth object to provide a rational method of defocusing an image applied to the above image defocusing apparatuses.

The first through fourth objects are fulfilled by an image defocusing apparatus for defocusing an image formed on a screen by modeling an object in a boundary box by updating pixel values on the image to approximate a lens's focusing effects. The apparatus comprises: a unit for computing data related to a circle of confusion for each point in the boundary box, the circle of confusion being a measure how defocused an out-of-focus point is on the screen; a unit for checking a reference pixel whose corresponding point's circle of confusion overlaps a target pixel; and a unit for updating an original value of the target pixel by taking into account a value of the reference pixel and the data related to the target pixel's circle of confusion.

the data related to the circle of confusion may comprise a radius and an area of each circle of confusion. The circle-of-confusion computing unit may include a radius calculating unit for computing a radius C of each circle of confusion using an expression:

$$C = |1 - p(d-f)/d(p-f)| * f/F$$

where p is a distance from a view point to a focal point, d is a Z value that represents a distance from the view point to each point, f is a focal length, and F is an iris value of a lens being used. The updating unit may include an area calculating unit for computing an area of each circle of confusion using their respective radiuses C.

The circle-of-confusion computing unit may further include a storage unit for storing the radiuses C of the circles of confusion in relation with their respective pixels' x, y coordinates.

The checking unit may include: a distance computing unit for computing a linear distance from the target pixel to each neighboring pixel; a comparing unit for comparing the linear distance with the radius C relative to each neighboring pixel by referring to their x, y coordinates; and a comparison-result outputting unit for selecting a neighboring pixel whose radius C is longer than the linear distance, and subsequently outputting the selected neighboring pixel as the reference pixel.

The updating unit may include a distributing unit for weighting a value of each reference pixel to determine a distribution within their own circles of confusion, the distribution being distributed to the target pixel; a target-pixel weighting unit for weighting an original value of the target pixel with the area of its circle of confusion; and an updating device for accumulating the distributions and the weighted value of the target pixel to yield a mean value, the original value of the target pixel being updated by the mean value.

The distributing unit may include a reference-pixel weighting unit for multiplying a value of each reference pixel by a reciprocal of an area of their respective circles of confusion.

The checking unit may further include: a spatial-location comparing unit for comparing Z values of the target pixel and the reference pixels, the Z value representing a distance from the view point to their corresponding points; and the image defocusing apparatus may further comprise: a unit for disallowing the updating unit to update the original value of the target pixel when the reference pixel has a larger Z value than the target pixel.

The checking unit may further include an output unit for comparing the Z values of the target pixel and the neighboring pixels to select a neighboring pixel whose Z value is smaller than the target pixel, and for subsequently outputting the selected neighboring pixel to the distance computing unit, the Z value representing a distance from the view point to their corresponding points.

The first through fourth objects are also fulfilled by an image defocusing apparatus for defocusing an image formed on a screen by modeling an object in a boundary box by updating pixel values on the image to approximate a lens's focusing effects. The apparatus comprises: a unit for computing data related to a circle of confusion for each point in the boundary box, the circle of confusion being a measure of how defocused an out-of-focus point is on the screen; a first checking unit for checking a first reference pixel whose corresponding point's circle of confusion overlaps a target pixel in a first direction; a first updating unit for updating an original value of the target pixel by taking into account a value of the first reference pixel and the data related to the target pixel's circle of confusion; a second checking unit for checking a second reference pixel whose corresponding point's circle of confusion overlaps the target pixel in a second direction, the second direction being orthogonal with respect to the first direction; and a second updating unit for updating the values updated by the first updating unit by taking into account a value of the second reference pixel and the data related to the target pixel's circle of confusion.

The data related to the circle of confusion may comprise a radius and an area of each circle of confusion. The circle-of-confusion computing unit may include a radius calculating unit for computing a radius C of each circle of confusion using an expression:

$$C=|1-p(d-f)/d(p-f)|*f/F$$

where p is a distance from a view point to a focal point, d is a Z value that represents a distance from the view point to each point, f is a focal length, and F is an iris value of a lens being used. The updating unit may include an area calculating unit for computing an area of each circle of confusion using their respective radiuses C.

The circle-of-confusion computing unit may further include a storage unit for storing the radiuses C of the circles of confusion in relation with their respective pixels' x, y coordinates.

The first checking unit may include: a first distance computing unit for counting the number of pixels between the target pixel and each pixel aligned in an array that contains the target pixel in the first direction, the number thus counted being a distance; a first comparing unit for comparing the distance and the radius C relative to each pixel aligned in the target pixel's array in the first direction by referring to their x, y coordinates; a first comparison-result outputting unit for outputting a pixel aligned in the first direction whose radius C is longer than the distance to the first updating unit as the first reference pixel. The second checking unit may include: a second distance computing unit for counting the number of pixels between the target pixel and each pixel aligned in an array that contains the target pixel in the second direction, the number thus counted being a distance; a second comparing unit for comparing the distance and the radius C relative to each pixel aligned in the target pixel's array in the second direction by referring to their x, y coordinates; and a second comparison-result outputting unit for outputting a pixel aligned in the second direction whose radius C is longer than the distance to the second updating unit as the second reference pixel.

The first updating unit may include a first distributing unit for weighting a value of the first reference pixel to determine a distribution within their own circles of confusion, the distribution being distributed to the target pixel. The second updating unit may include a second distributing unit for weighting a value of the second reference pixel to determine a distribution within their own circles of confusion, the distribution being distributed to the target pixel.

The first distributing unit may include a first reference-pixel weighting unit for multiplying an original value of each reference pixel by a reciprocal of an area of their respective circles of confusion, and the second distributing unit may include a second reference-pixel weighting unit for multiplying an original value of each reference pixel by a reciprocal of an area of their respective circles of confusion.

The image defocusing apparatus may further comprise a unit for withholding the value of the target pixel updated by the first updating unit to transfer them to the second updating unit.

The first checking unit may include a first spatial-location comparing unit for comparing the Z values of the target pixel and the first reference pixel, the Z value representing a distance from the view point to their corresponding points. The second checking unit may include a second spatial-location comparing unit for comparing the Z values of the target pixel and the second reference pixel. The first updating unit may include a first disallowing unit for disallowing the first updating unit to update the original value of the target pixel when the target pixel has a smaller Z value. The second updating unit may include a second disallowing unit for disallowing the second updating unit to update the original value of the target pixel when the target pixel has a smaller Z value.

The first checking unit may further include a first output unit for comparing the Z values of the target pixel and the neighboring pixels to select a neighboring pixel whose Z value is smaller than the target pixel, and for subsequently outputting the selected neighboring pixel to the first distance computing unit, the Z value representing a distance from the view point to their corresponding points. The second checking unit may further include a second output unit for comparing Z values of the target pixel and the neighboring pixels to select a neighboring pixel whose Z value is smaller than the target pixel, and for subsequently outputting the selected neighboring pixel to the second distance computing unit.

The fifth object is fulfilled by a method of defocusing an image by updating pixel values on the image formed on a screen by modeling an object in a boundary box. The method comprises the steps of:

(1) computing data related to a circle of confusion for each point in the boundary box, the circle of confusion being a measure of how defocused an out-of-focus point is on the screen;

(2) checking a reference pixel whose corresponding point's circle of confusion overlaps a target pixel; and (3) updating an original value of the target pixel by taking into account a value of the reference pixel and the data related to the target pixel's circle of confusion.

The first step may comprise the substep of:

(a) computing a radius C of each circle of confusion using an expression:

$$C=|1-p(d-f)/d(p-f)|*f/F$$

where p is a distance from a view point to a focal point, d is a Z value, f is a focal length, and F is an iris value of a lens being used.

The second step may include the sub-steps of:

(a) computing a distance from the target pixel to each neighboring pixel;

(b) comparing the distance with a radius C of the overlapping circle of confusion relative to each neighboring pixel;

(c) selecting a neighboring pixel whose radius C is longer than the distance as the reference pixel;

(d) selecting another target pixel; and (e) proceeding the third step when all the pixels on the image have been selected as the target pixel and been through the substeps (a) through (c) of the second step.

The third step may comprise the substeps of:

(a) weighting a value of each reference pixel to determine a distribution to the target pixel;

(b) computing an area of each overlapping circle of confusion and the target pixel's circle of confusion to weight the original value of the target pixel with the area of its circle of confusion;

(c) accumulating the distributions and the weighted value of the target pixel to yield a mean value, and updating the original value of the target pixel with the mean value;

(d) selecting another target pixel; and (e) terminating to update the target pixel's value when all the pixels have been selected as the target pixel and been through the substeps (a) through (c) of the third step.

The image defocusing method may further comprise the steps of:

(4) comparing Z values of the target pixels and neighboring pixels, the Z value representing a distance from a view point to their corresponding points, and (5) disallowing to update the original value of the target pixel when the neighboring pixel has a larger Z value than the target pixel.

The second step may further comprise the substep of:

(f) comparing Z values of the target pixels and neighboring pixels to select a neighboring pixel whose Z value is smaller than the target pixel prior to the substep (a) of the second step.

The fifth object is also fulfilled by a method of defocusing an image by updating pixel values on the image formed on a screen by modeling an object in a boundary box. The method comprises the steps of:

(1) computing data related to a circle of confusion for each point in the boundary box, the circle of confusion being a measure of how defocused an out-of-focus point is on the screen;

(2) checking a first reference pixel whose corresponding point's circle of confusion overlaps a target pixel along a first direction;

(3) updating an original value of the target pixel by taking into account a value of the first reference pixel and the data related to the target pixel's circle of confusion;

(4) checking a second reference pixel whose corresponding point's circle of confusion overlaps the target pixel along a second direction, the second direction being orthogonal with respect to the first direction; and (5) updating the value updated at the third step by taking into account a value of the second reference pixel and the data related to the target pixel's circle of confusion.

The second and fourth steps may respectively comprise the substep of:

(a) comparing z values of the target pixels and neighboring pixels, the z value representing a distance from a view point to their corresponding points. The third and fifth steps may respectively comprise the substep of:

(a) disallowing to update the original value of the target pixel when the neighboring pixel has a larger z value than the target pixel.

The second and fourth steps may further and respectively comprise the substep of:

(b) comparing the z values of the target pixels and neighboring pixels to select a neighboring pixel whose Z value is smaller than the target pixel prior to the substep (a) of the second step and the substep (a) of the fourth step, respectively.

According to the present invention, data related to the circle of confusion of each pixel is computed by taking into account their respective Z values and the focal length and focal point of the lens being used. As a result, the color intensity (pixel value) on the object in focus is not distributed to the background in the defocused image, disallowing the object to appear larger than it should. Also, the color intensity on the object out of focus is distributed according to the Z values and lens's focusing effects. Thus, the defocused image approximates the way they appear when seen through a camera.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIGS. 7A and 7B are illustrations explaining the selection of reference pixels by a RP address calculator;

FIGS. 11A, 11B, and 11C are illustrations explaining the selection of reference pixels by a first RP address calculator;

FIGS. 12A, 12B and 12C and illustrations explaining the selection of reference pixels by a second RP address calculator; and FIG. 13 is a flowchart detailing the operation of the defocus processing unit in FIG. 10.

DESCRIPTION OF THE PREFERRED EMBODIMENTS

FIRST EMBODIMENT

Figure 1:
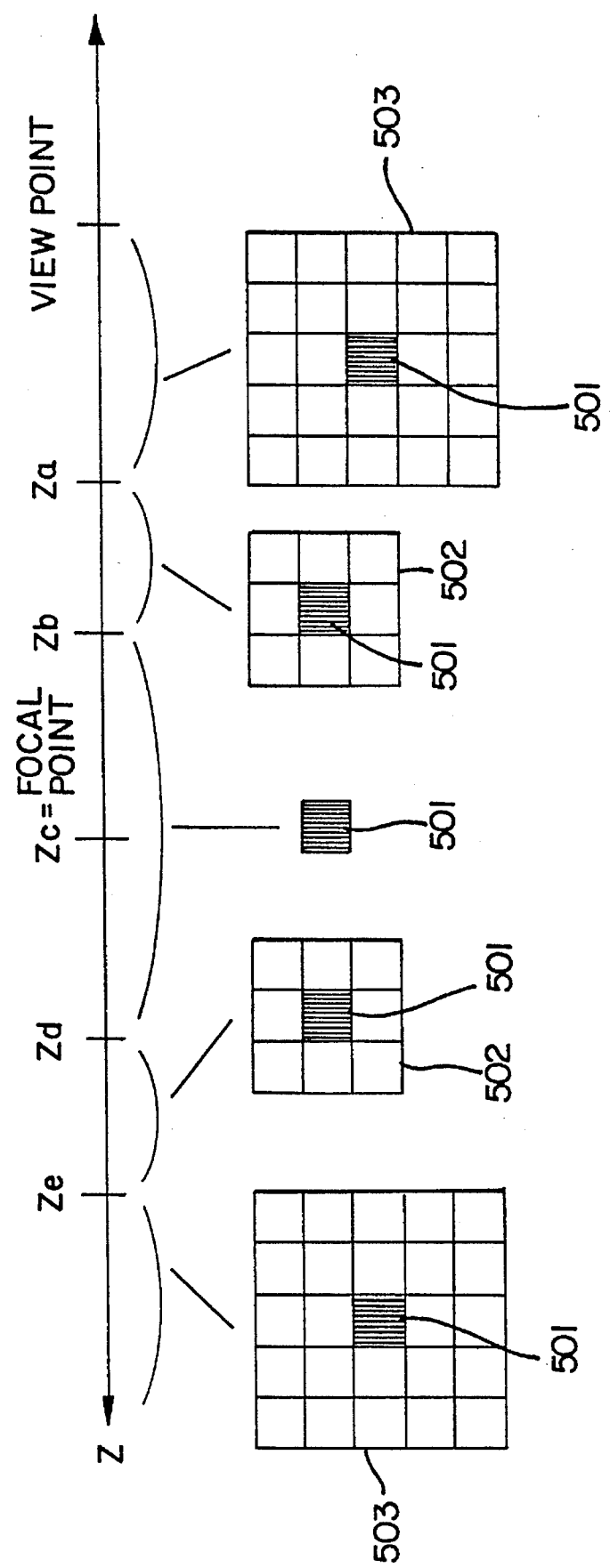
FIG. 1 is a view explaining a conventional "defocusing" process.
Figure 2A:
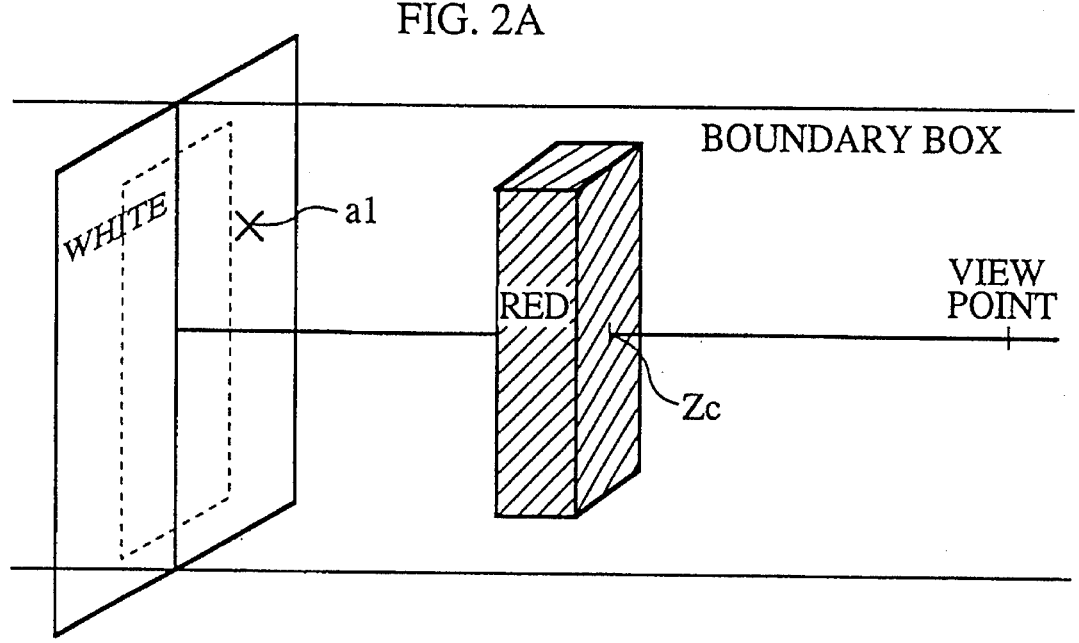
FIGS. 2A, 2B, and 2C are examples of a defocused image formed by the conventional "defocusing" process.
Figure 2B:
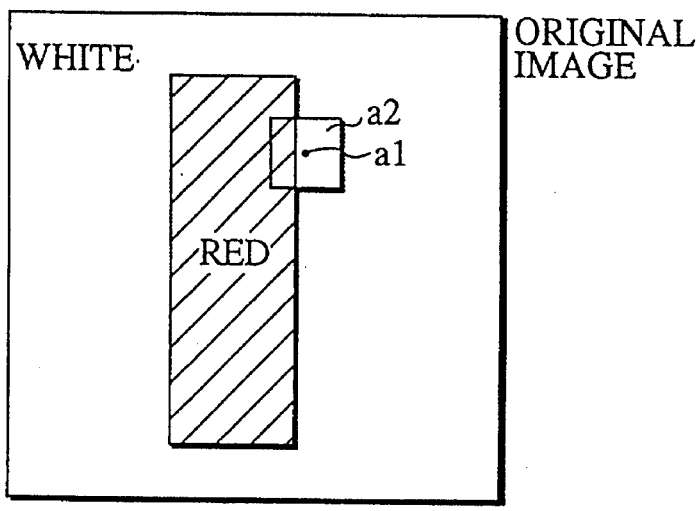
Figure 2C:
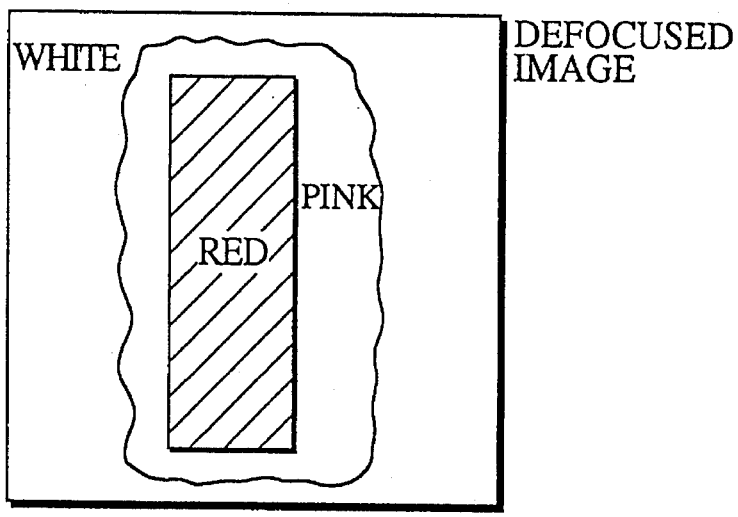
Figure 3:
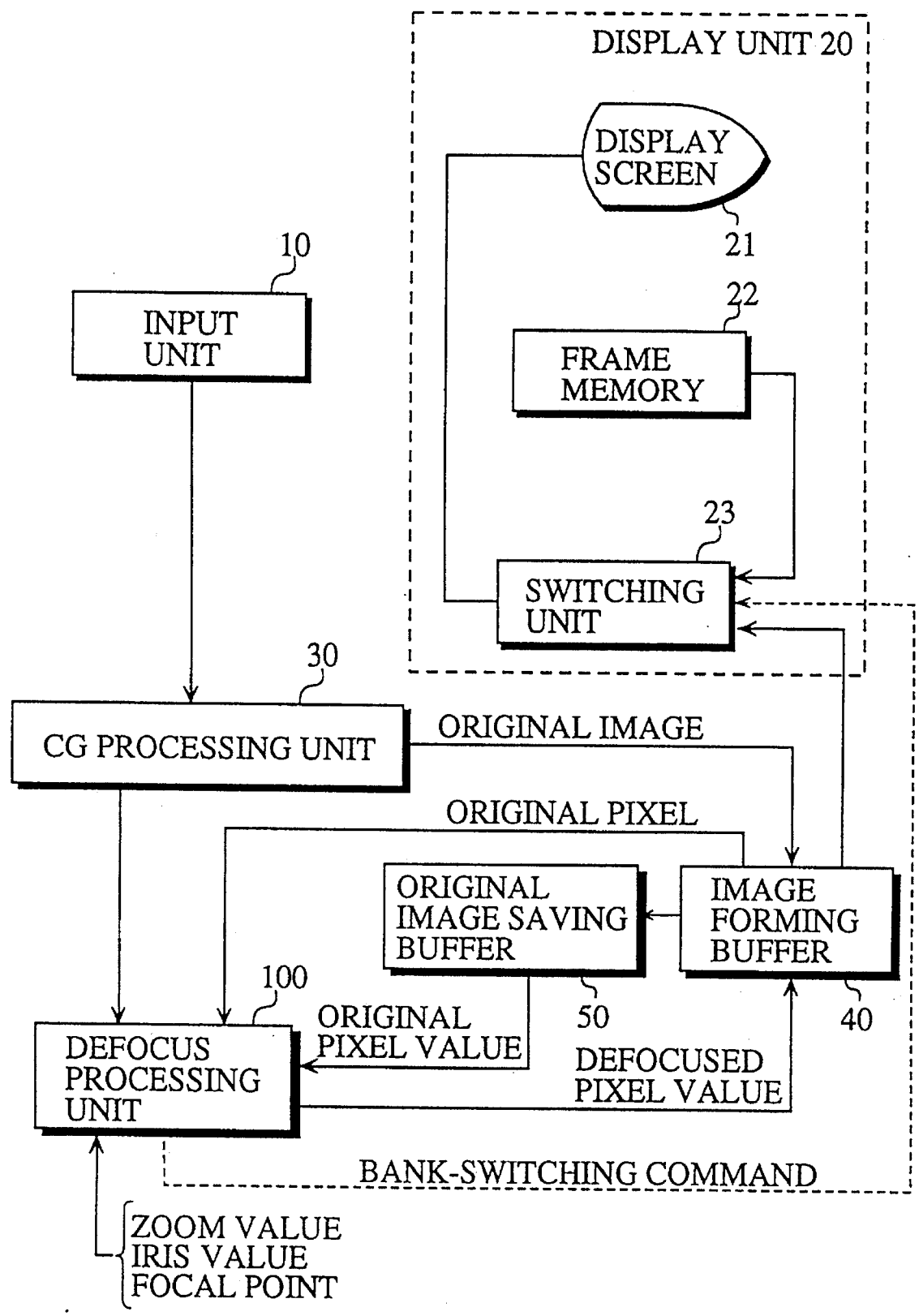
FIG. 3 is a view showing a structure of an image defocusing apparatus of the present invention.

FIG. 3 shows a structure of an image defocusing apparatus in accordance with the first embodiment of the present invention. The image defocusing apparatus comprises an input unit 10, a display unit 20, a CG (computer graphics) processing unit 30, an image forming buffer 40, an original-image saving buffer 50, and a defocus processing unit 100. Since the resulting defocused image is synthesized into a video taken by a video camera, the lens's focusing effects of the lens must be taken into account at the time of defocusing. For this reason, data related to the optical characteristics of a lens being used, such as a zoom value, an iris value, a focal point, have been inputted into the defocus processing unit 100 in advance. The explanation of the structure and operation for the synthetic-image formation is omitted herein; for they are not the gist of the present invention.

The input unit 10 is used to input data, such as geometric data, light source data, view point data, and image distance data into the CG processing unit 30. The details of the data are as follows:

Geometric data: Shape of an object to be modeled

Light source data: Location of a light source

View point data: Location of a view point, a view vector, and a viewing angle

Image distance data: Distance from the view point to an image

The display unit 20 includes a display screen 21, a frame memory 22, and a switching device 23. The display screen 21 displays the data either in the frame memory 22 or the image forming buffer 40 under the control of the switching device 23 with a bank-switching command sent from the defocus processing unit 100.

The CG processing unit 30 forms an original image of an object to be modeled by a process called "rendering" with the data from the input unit 10. The image forming process will be described in the following by referring to FIG. 4, although the explanation of the "rendering" is omitted.

To begin with, the CG processing unit 30 forms an object O1 at a focal length in a boundary box with the geometric data. Then, the CG processing unit 30 fixes a view point C1 at (0, 0, 0) in x, y, z coordinates with the view point data, while placing a screen S1 with the image distance data; C1 corresponds to a location of the video camera, and S1 is an image plane for the original image of O1. Accordingly, the CG processing unit 30 computes a Z value of each point for their respective corresponding pixels; the Z value represents a distance between C1 and each point in the z coordinate, the direction in which the video camera is aimed. Thus, the Z values given to pixels G1, G3 are the z coordinates of a point G2 on O1 and a point G4 on the background, respectively. Further, the CG processing unit 30 removes hidden-surfaces using the Z values thus given, and outputs the resulting original image to the image forming buffer 40 first, and then saves the same in the original-image saving buffer 50. On the other hand, the CG processing unit 30 activates the defocus processing unit 100 by sending an operation-start command together with the Z values.

Figure 4:
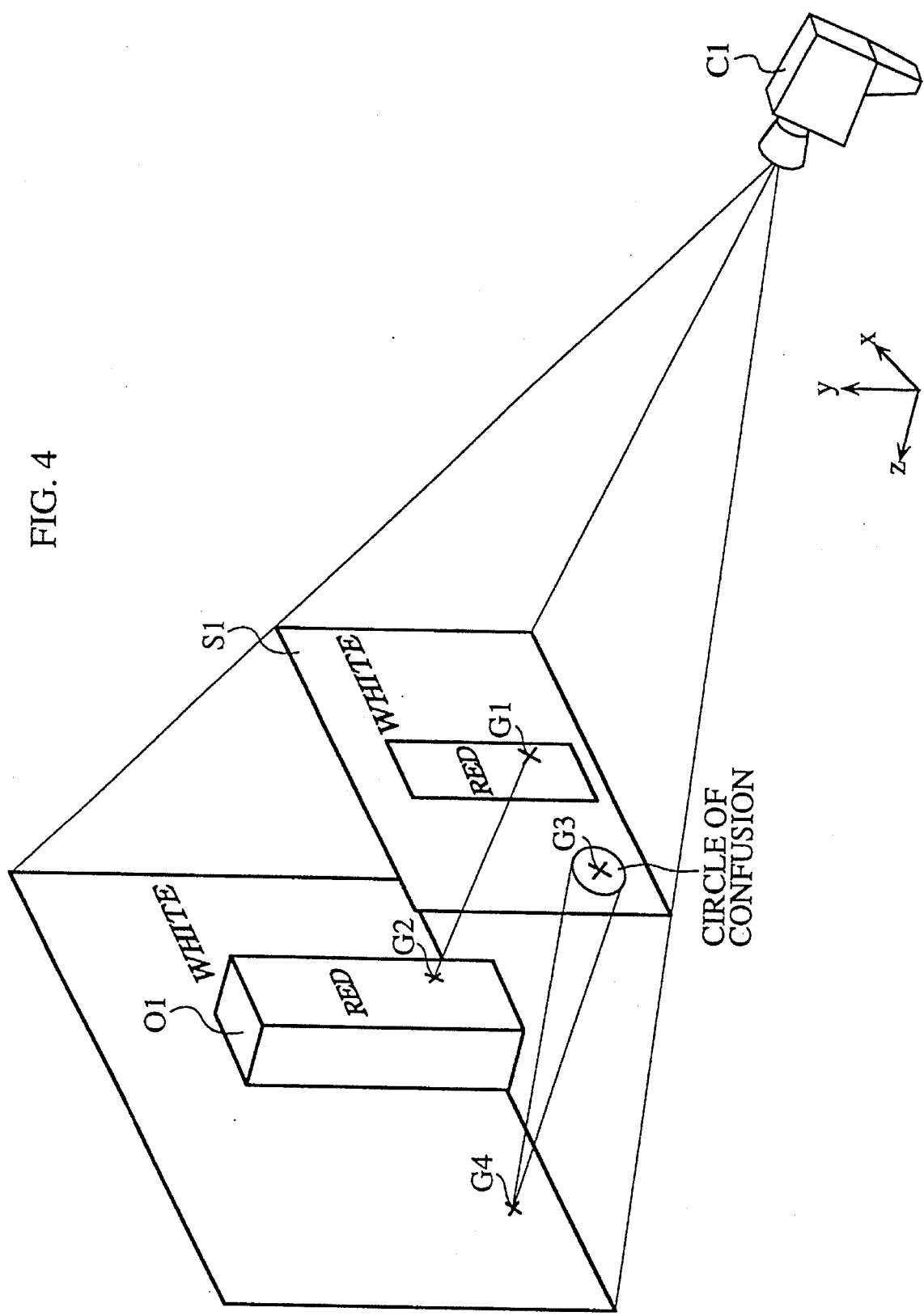
FIG. 4 is a perspective view showing the relation between a boundary box and a screen in location.
Figures 6A, 6B, 6C, 6D:
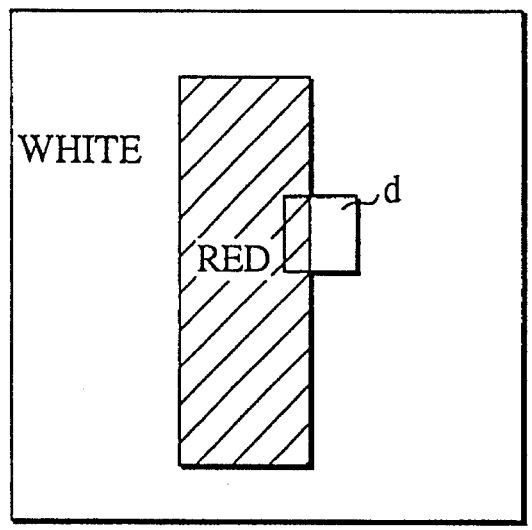
FIGS. 6A, 6B, 6C, and 6D are illustrations of examples of the data in an image forming buffer, an original-image saving buffer, a Z buffer, and a COC buffer.

The image forming buffer 40 receives the original image and stores values representing RGB intensities on each pixel, i.e., pixel values, of the original image in relation with their x, y coordinates. For example, the original image of FIG. 4 is shown in FIG. 6A, and for the pixels within a rectangle d, the image forming buffer 40 stores values as shown in FIG. 6B. Each rectangle in the grid represents the pixels, while the values in brackets the RGB intensities, and the rows and columns the x, y coordinates, respectively. Note that the original pixel values are updated by the values from the defocus processing unit 100.

The original-image saving buffer 50 saves the original image in the same way as the image forming buffer 40.

Figure 5:
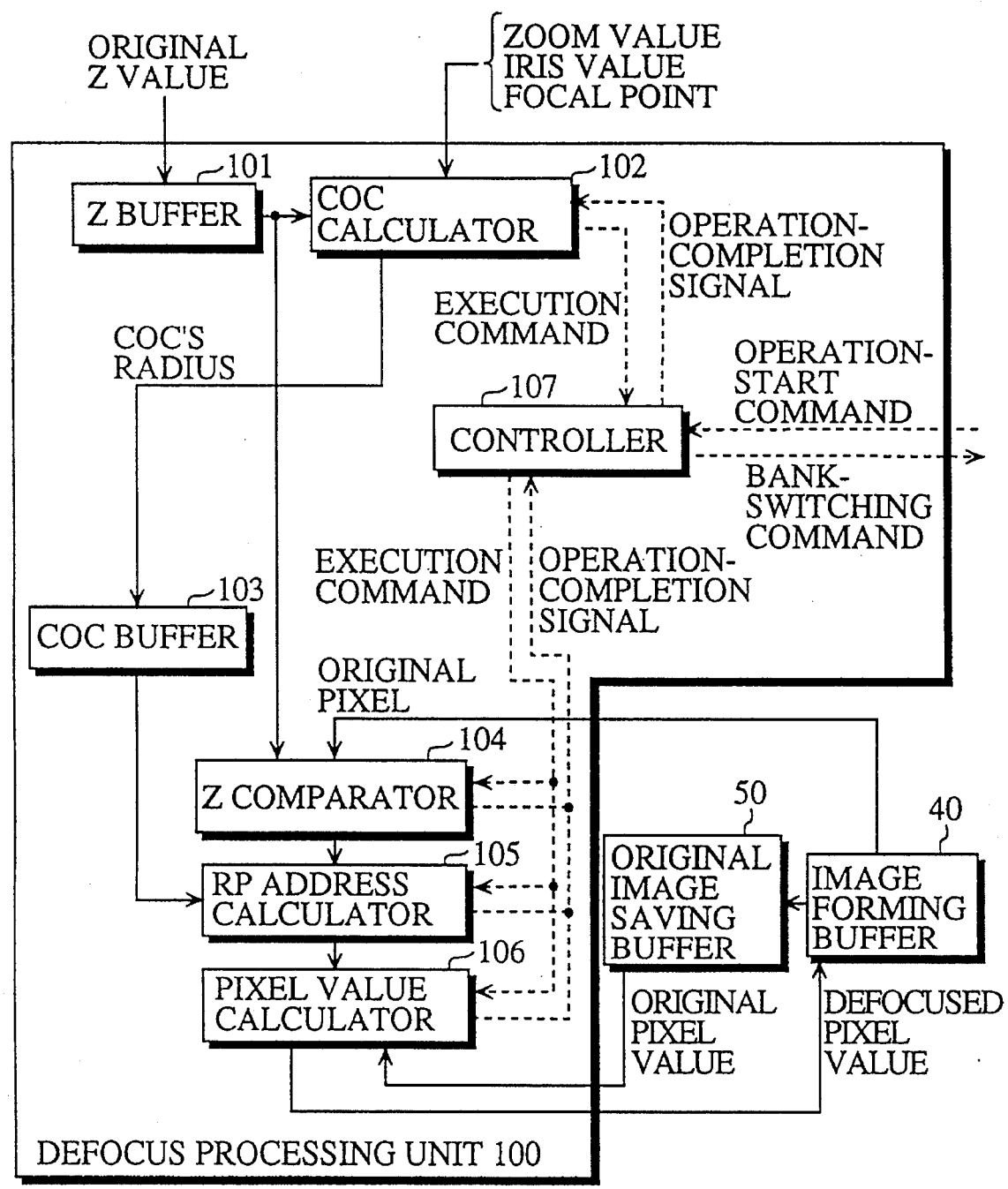
FIG. 5 is a block diagram depicting the structure of a defocus processing unit in accordance with the first embodiment.

The defocus processing unit 100 forms a defocused image based on the original image with the Z values and optical characteristics of the lens. The structure of the defocus processing unit 100 is depicted in FIG. 5. The defocus processing unit 100 comprises a Z buffer 101, a COC (circle of confusion) calculator 102, a COC buffer 103, a Z comparator 104, a RP (reference pixel) address calculator 105, a pixel value calculator 106, and a controller 107.

More precisely, the Z buffer 101 receives the Z value for each original pixel from the CG processing unit 30 and stores them in relation with the their x, y coordinates. For the rectangle d in FIG. 6A, the Z buffer 101 stores the values as shown in FIG. 6C.

The COC calculator 102 computes a radius C of a circle of confusion of each point for their corresponding pixels by Expression 1 as below with the Z value read out from the Z buffer 101 and the lens's optical characteristics data stored in advance. Note that the circle of confusion is an out-of-focus point appearing as a circle rather than a point in the image, and is a measure of how defocused the out-of-focus point is.

$$C = |1 - p(d-f)/d(p-f)| * f/F \qquad \text{[Expression 1]}$$

where p is a distance from the view point to the focal point, d is the Z value, f is the focal length, and F is the iris value.

The COC buffer 103 stores the radiuses C of the circles of confusion in relation with their x, y coordinates. For the rectangle d in FIG. 6A, the COC buffer 102 stores the values as shown in FIG. 6D.

The Z comparator 104 reads out the original pixels from the image forming buffer 40 one by one as a target pixel, and selects the neighboring pixels for each target pixel. The neighboring pixels are the pixels such that satisfy |X−u|≦t and |Y−v|≦t, given a target pixel (X,Y), an arbitrary pixel (u,v), and a constant t which varies with an amount of computation. Further, the Z comparator 104 reads out the Z values of both the target and neighboring pixels from the Z buffer 101 using their x, y coordinates to select the neighboring pixels whose Z values are smaller than the target pixel. The neighboring pixels thus selected are outputted to the RP address calculator 105 and referred to as nominated pixels hereinafter.

The RP address calculator 105 computes a distance between the target pixel and each nominated pixel while reading out the radius C of each nominated pixel from the COC buffer 103 using their x, y coordinates, and selects the ones whose radiuses C are longer than the computed distance. The nominated pixels thus selected are outputted to the pixel value calculator 106 and referred to as reference pixels hereinafter.

The selection of the reference pixels will be explained by using the rectangle d in FIG. 6A as an example. FIG. 7A shows the pixel arrays within the rectangle d, where P00 through P46 represent the original pixels. Assume that P23 is read out as the target pixel and P00 is selected as one of the nominated pixels. Then, the RP address calculator 105 computes a distance between P23 and P00 with their x, y coordinates, i.e, $\sqrt{3^2+4^2}=5$, and accordingly compares the distance, 5, with the radius C of P00's circle of confusion, 0 as shown in FIG. 6D. Given that the radius C is shorter than the distance, the P00 is left out from the nomination. In case of another nominated pixel P25, the distance is 2 while the radius C is 3 as shown in FIG. 6D, and thus, P25 is selected as the reference pixel. FIG. 7B shows a set of the reference pixels for P23 selected in this way.

The pixel value calculator 106 computes the distributions of the original values of the reference pixels within their own circles of confusion and a weighted value of the target pixel to yield a mean value. Accordingly, the pixel value calculator 106 updates the original pixel values in the image forming buffer 40 with the mean values. More precisely, the pixel value calculator 106 computes an area of the circle of confusion for each reference pixel using their respective radiuses C, and reads out the original pixel values for the reference pixels from the image saving buffer 50. Accordingly, the pixel value calculator 106 multiplies the original pixel values with a weight coefficient, i.e., the reciprocal of the area of their own circles of confusion, to compute the distributions. Likewise, the pixel value calculator 106 computes an area of the target pixel's circle of confusion, and reads out the original pixel value of the target pixel from the image saving buffer 50 to multiply the original pixel value with the reciprocal. Note that when the target pixel is in focus(exhibiting a 0-radius), the pixel value calculator 106 invariably gives a value 1 to the reciprocal.

The controller 107 controls the above-described components by sending an execution command and receiving an operation-completion signal.

Figure 8:
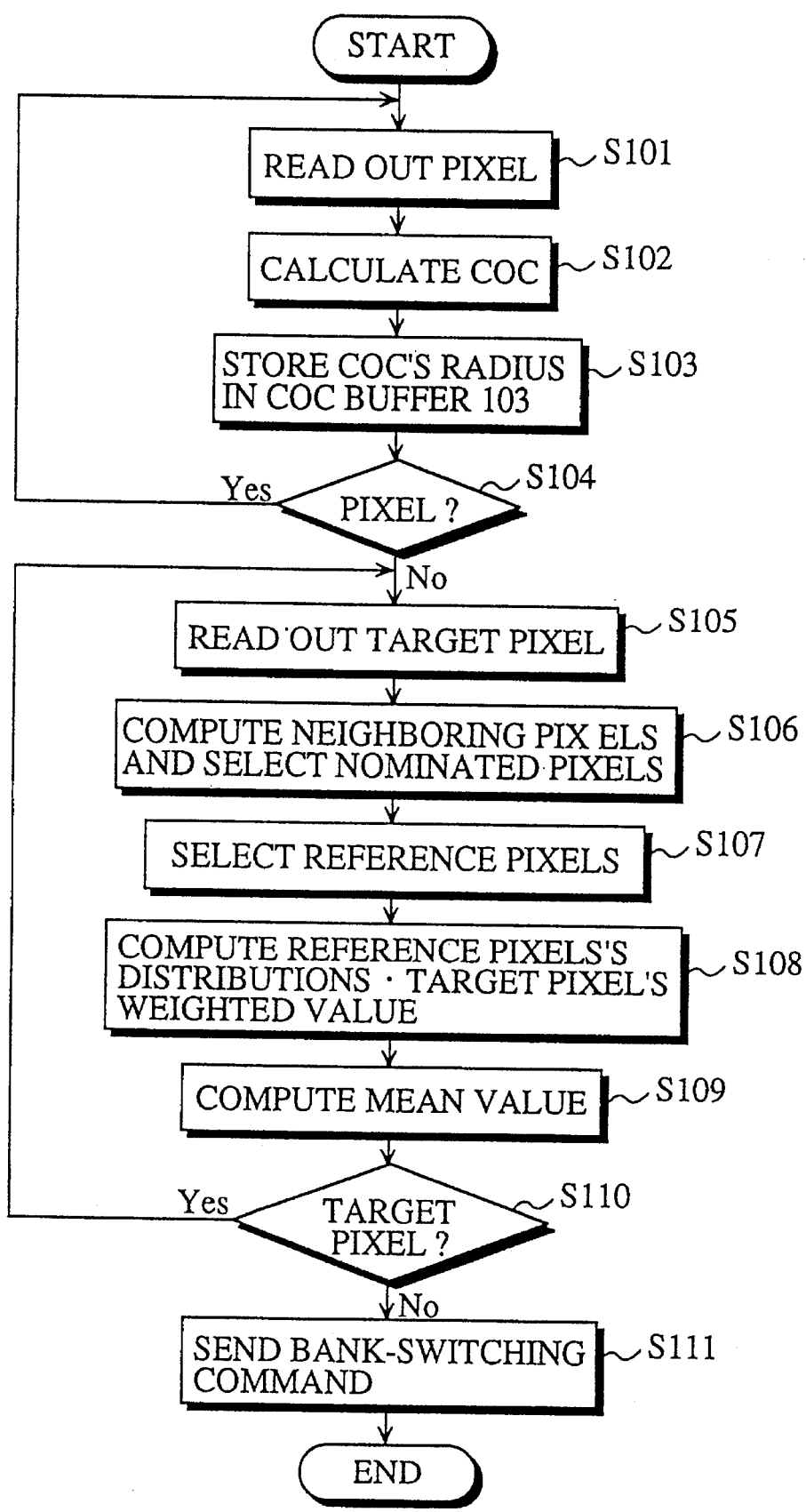
FIG. 8 is a flowchart detailing the operation of the defocus processing unit in FIG. 5.

The operation of the above-described defocus processing unit 100 will be explained by referring to the flowchart in FIG. 8. Note that the controller 107 activates the z comparator 104 when it has received the operation-completion signal from the COC calculator 102, and likewise, the RP address calculator 105 from the Z comparator 104, the pixel value calculator 106 from the RP address calculator 105, and these descriptions are not repeated in the following.

Upon the receipt of the operation-start command from the CG processing unit 30, the controller 107 activates the COC calculator 102. The COC calculator 102 then computes the radius C of the circle of confusion of each point in the boundary box for their respective pixels, and the computation results are stored into the COC buffer 103 in relation with their x, y coordinates(Steps 101–104). Subsequently, the controller 107 activates the Z comparator 104, so that it reads out one original pixel as the target pixel from the image forming buffer 40 and selects its neighboring pixels while reading out their Z values from the Z buffer 101 to select the nominated pixel(Steps 105–106). Then, the controller 107 activates the RP address calculator 105, which correspondingly selects the reference pixels from the nominated pixels(Step 107). Accordingly, the controller 107 activates the pixel value calculator 106, which, in response, computes the distributions of the reference pixels within their own circles of confusion and the weighted value of the target pixel(Step 108), and further computes the mean value to update the original value of the target pixel(Step 109). Finally, the controller 107 checks whether all the original pixels in the image forming buffer 40 are read out as the target pixel or not(Step 110). If so, it issues the bank-switching command to the switching unit 23, so that the resulting defocused image in the image forming buffer 40 is displayed on the display screen 21 (Step 111); otherwise it returns to Step 105.

Figure 9:
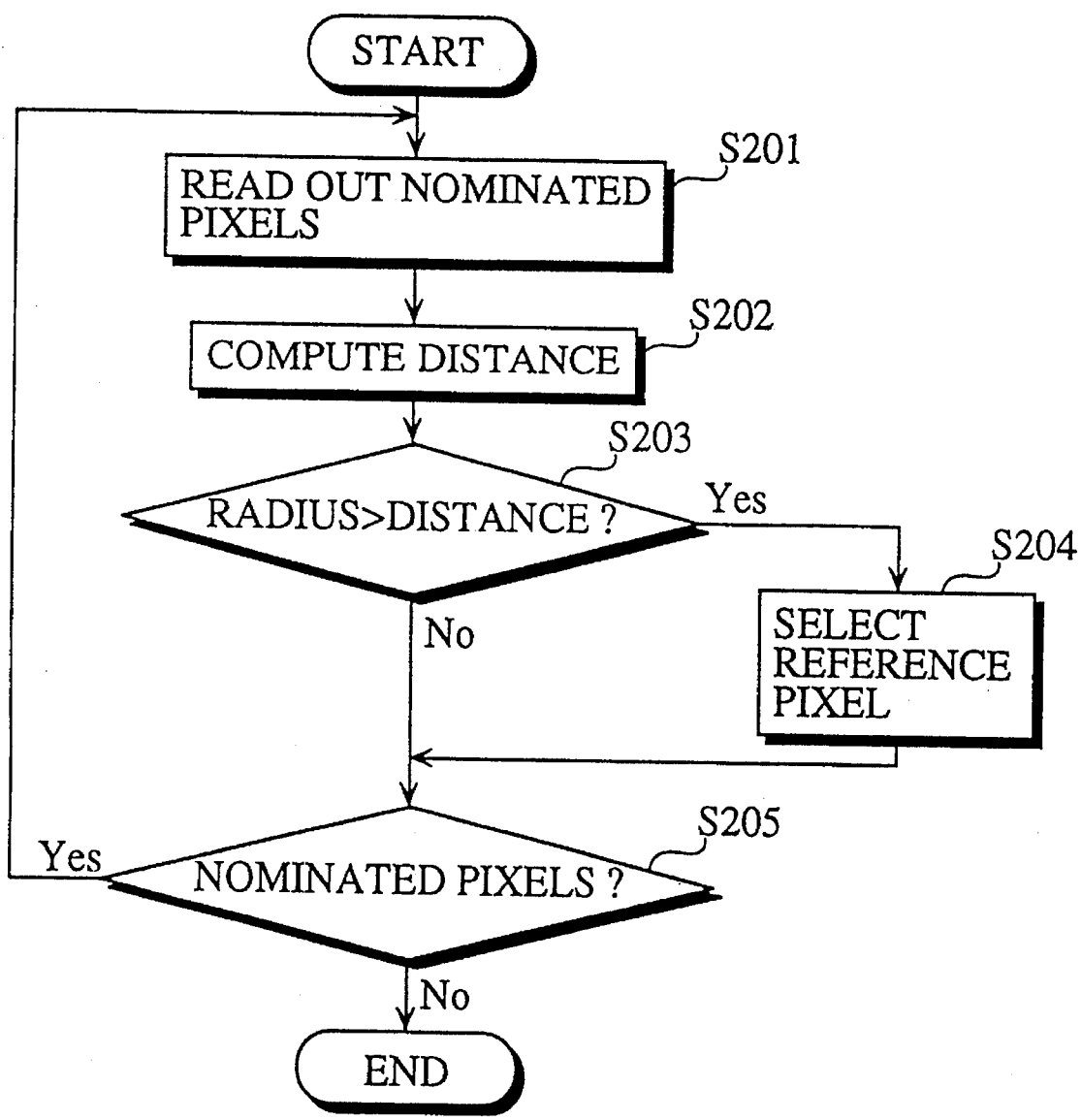
FIG. 9 is sub-routine of the flowchart in FIG. 8.

FIG. 9 is a subroutine of Step 107, detailing the operation of the RP address calculator 105. The RP address calculator 105 receives the nominated pixels for the target pixels from the Z comparator 104(Step 201), and computes a distance between the target pixel and each nominated pixel(Step 202). Accordingly, the RP address calculator 105 compares the computed distance and the radius C of the circle of confusion of each nominated pixel to select the reference pixels(Steps 203–204), and checks whether it has received all the nominated pixels for the target pixel or not(205). If not, it returns to Step 201; otherwise it terminates the operation and sends the operation-completion signal to the controller 107.

From the foregoing description, it is understood that the points in focus do not appear in the circles of confusion, and thus their corresponding pixels are given the 0-radius, and left out from the nomination. Therefore, even when their corresponding pixels are overlapped by the circles of confusion of the neighboring out-of-focus points, their pixel values are not distributed within the overlapping circles of confusion. As a result, the points in focus appear clear and sharp while the out-of-focus points defocused correspondingly to their Z-values, enabling the object's edge to appear clear and sharp and in a size it should when the object is in focus. Also, in case of the out-of-focus points, their corresponding pixels whose Z values are larger than the target pixel are not selected as the nominated pixels, and the nominated pixels whose radiuses C are shorter than the distance to the target pixel are left out from the nomination, enabling the pixel value distribution in accordance with their spatial location. Thus, the points both in focus and out of focus appear in the approximate way when seen through a camera.

In the foregoing embodiment, the neighboring pixels having larger Z values than the target pixel are excluded from the nominated pixels. However, they may be included in the reference pixels on the condition that the controller 107 disallows the pixel value calculator 106 to compute the distributions relative to these neighboring pixels.

Note that the defocus processing unit 100 may include a plurality of pixel value calculators 106 for parallel processing.

SECOND EMBODIMENT

An image defocusing apparatus in accordance with the second embodiment of the present invention is identical with that of the first embodiment except that the defocus processing unit 100 is replaced with a defocus processing unit 300.

Figure 10:
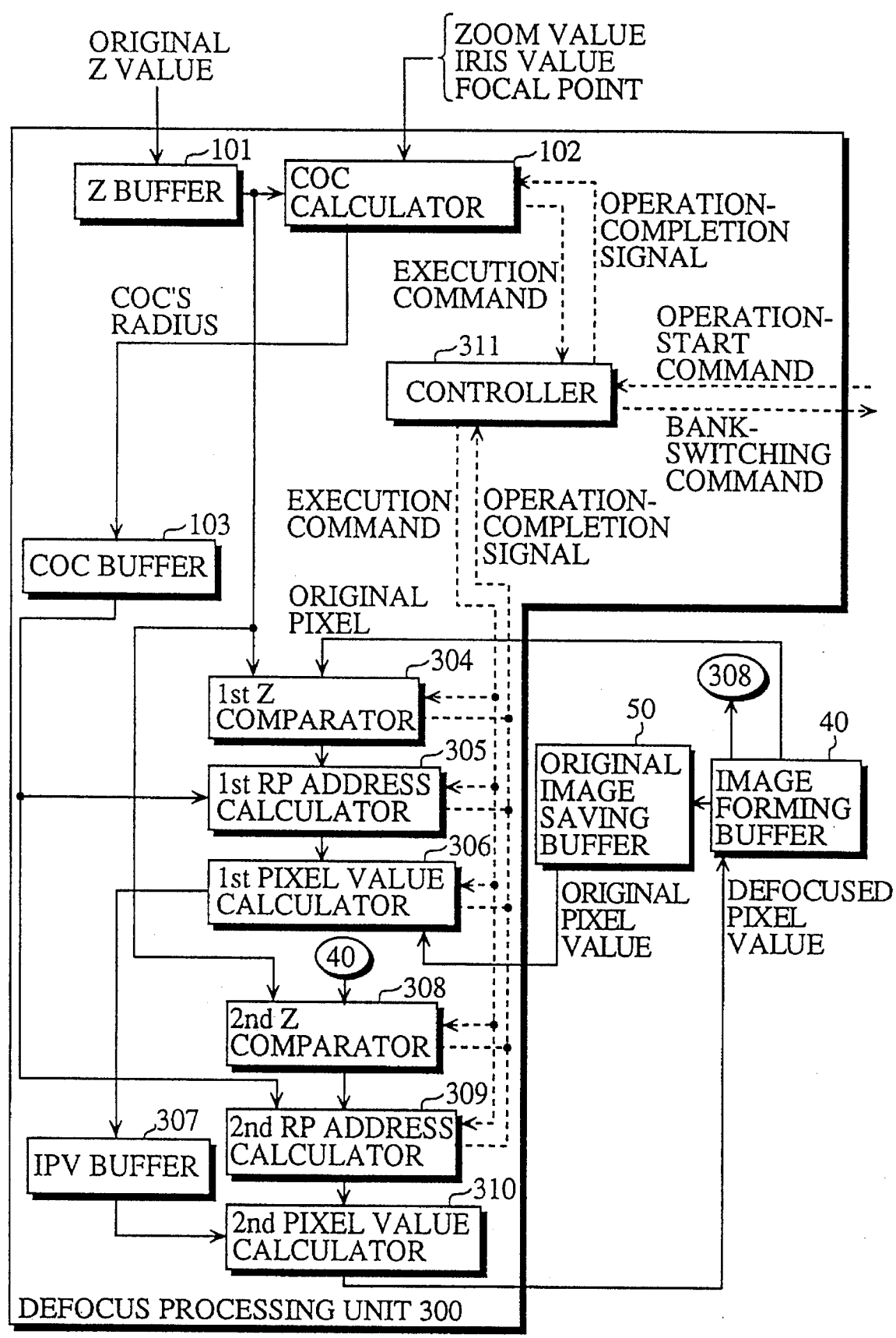
FIG. 10 is a block diagram depicting the structure of a defocus processing unit in accordance with the second embodiment.

More precisely, as is shown in FIG. 10, the Z comparator 104 is replaced with a first Z comparator 304 and a second Z comparator 308; the RP address calculator 105 is replaced with a first RP address calculator 305 and a second RP address calculator 309; the pixel value calculator 106 with a first pixel value calculator 306 and a second pixel value calculator 310; the controller 107 with a controller 311; and an IPV(intermediate pixel value) buffer 308 is additionally included. Hereinafter, like components are labeled with like reference numerals with respect to the first embodiment, and the description of these components is not repeated.

The first Z comparator 304 operates in the same way as the Z comparator 104 except that it outputs the nominated pixels to the first RP address calculator 305.

The first RP address calculator 305, unlike the RP address calculator 105, selects the reference pixels within a certain range along the x coordinate; hence the reference pixels have radiuses C larger than the certain value. For example, when P03 in FIG. 7 is the target pixel, then the first RP address calculator 305 selects P04, P05 as the reference pixels as is shown in FIG. 11A; when P04, then P03, P05 in FIG. 11B; when P05, then P03, P04 in FIG. 11C. The reference pixels thus selected are outputted to the first pixel value calculator 305.

The first pixel value calculator 306 computes the distributions of the reference pixels within their own circles of confusion and the weighted value of the target pixel, and further the mean value in the same way as the pixel value calculator 106. The value thus calculated is referred to as an intermediate pixel value hereinafter.

The intermediate pixel value buffer 307 stores the intermediate pixel values in relation with their x, y coordinates.

The second Z comparator 308 operates in the same way as the Z comparator 104 except that it outputs the nominated pixels to the second RP address calculator 309.

The second RP address calculator 309 selects the reference pixels within a certain range along the y coordinate; hence the reference pixels have the radiuses C larger than the certain value. For example, when P03 in FIG. 7 is the target pixel, then the second RP address calculator 309 selects P13, P23, and P33 as the reference pixels as is shown in FIG. 12A; when P13, then P03, P23, and P33 in FIG. 12B; when P23, then P03, P13, P33 in FIG. 12C. The reference pixels thus selected are outputted to the second pixel value calculator 310.

The second pixel value calculator 310 computes the distributions of the reference pixels within their own circles of confusion and the weighted value of the target pixel using the intermediate pixel values read out from the IPV buffer 307 in the same way as the pixel value calculator 106, and further computes the mean value. The value thus computed is referred to as the defocused pixel value hereinafter.

The controller 311 controls the above-described components by sending the execution command and receiving the operation-completion signal in the same way as the controller 107.

The operation of the above-described defocus processing unit 300 will be explained by referring to the flowchart in FIG. 13. The explanation for Steps 101 through 104 is omitted; for they are identical with FIG. 8 in the first embodiment.

Having received the notice of operation-completion signal from the COC calculator 102, the controller 311 activates the first Z comparator 304, which, in response, reads out one original pixel from the image forming buffer 40 and selects the neighboring pixels to further select the nominated pixels (Steps 305, 306).

Subsequently, the controller 311 activates the first RP address calculator 305, which then selects the reference pixels from the nominated pixels relative to the value in the x-coordinate (Step 307). Next, the controller 311 activates the first pixel value calculator 305, which computes the distributions of the reference pixels within their own circles of confusion and the weighted value of the target pixel, and further the mean value, i.e., the intermediate pixel value (Steps 308, 309). Then, the controller 311 checks whether all the pixels in the image forming buffer 40 are read out as the target pixel or not (Step 310). If not, it returns to Step 305; otherwise it activates the second Z comparator 308, which, in response, selects the neighboring pixels to further select the nominated pixels (Steps 311, 312). Subsequently, the controller 311 activates the second RP address calculator 310, which accordingly selects the reference pixels from the nominated pixels relative to the value in the y coordinate (Step 313). Subsequently, the controller 311 activates the second pixel value calculator 310, so that it computes the distributions of the reference pixels within their own circles of confusion and the weighted value of the target pixel by using the intermediate pixel values, and further the mean value, i.e., the distributed pixel value (Steps 314, 315). Finally, the controller 311 checks whether all the pixels in the image forming buffer 40 are read out as the target pixel (Step 316). If not, it returns to Step 311; otherwise, it issues the bank-switching command to the switching unit 23, so that the resulting defocused image in the image forming buffer 40 is displayed on the display screen 21 (Step 111)

By using the x, y coordinates separately, the reference pixels are selected faster than the first embodiment; the distance from the target pixel to each nominated pixel can be computed by simply counting the number of pixels between the two pixels in respective coordinates, instead of computing the root-square-mean value.

Note that the first RP address calculator 305 may select the reference pixels relative to the value in y-coordinate, and the second RP address calculator 309 x-coordinate.

In the foregoing embodiment, the neighboring pixels having larger Z values than the target pixel are excluded from the nominated pixels. However, they may be included in the reference pixels on the condition that the controller 311 disallows the first and second pixel value calculators 306, 310 to compute the distributions relative to these neighboring pixels.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image defocusing apparatus for defocusing an image formed on a screen by modeling an object in a boundary box by updating pixel values on the image to approximate a video camera lens' focusing effects, the apparatus comprising:

setting means for a position of the video camera lens in virtual space;

input means for inputting from the video camera a distance from a viewpoint to a focal point of the video camera lens, an iris value of the lens and a focal position;

means for computing data relating to a circle of confusion for each point in the boundary box based on the input values inputted from the input means and a set position set by the setting means, the circle of confusion being a measure of how defocused on out-of-focus point is to be displayed on the screen;

means for storing the computed data of a circle of confusion of each point;

means for checking a reference pixel whose corresponding point's circle of confusion overlaps a target pixel;

means for updating an original value of the target pixel by taking into account a value of the reference pixel and the data related to the target pixel's circle of confusion; and means for enabling the display of an image based on the updated pixel values.

2. The apparatus of claim 1, wherein the data related to the circle of confusion comprises a radius and an area of each circle of confusion, and wherein the circle-of-confusion computing means includes:

a radius calculating unit for computing a radius C of each circle of confusion using an expression:

$$C = |1 - p(d-f)/d(|*f/F$$

where p is a distance from a view point to a focal point, d is a Z value that represents a distance from the view point to each point, f is a focal length, and F is an iris value of a lens being used, and wherein the updating means includes:

an area calculating unit for computing an area of each circle of confusion using their respective radiuses C.

3. The apparatus of claim 2, wherein the circle-of-confusion computing means further includes a storage unit for storing the radiuses C of the circles of confusion in relation with their respective pixels' x, y coordinates.

4. The apparatus of claim 3, wherein the checking means includes:

a distance computing unit for computing a linear distance from the target pixel to each neighboring pixel;

a comparing unit for comparing the linear distance with the radius C relative to each neighboring pixel by referring to their x, y coordinates; and a comparison-result outputting means for selecting a neighboring pixel whose radius C is longer than the linear distance, and subsequently outputting the selected neighboring pixel as the reference pixel.

5. The apparatus of claim 4, wherein the updating means includes:

a distributing unit for weighting a value of each reference pixel to determine a distribution within their own circles of confusion, the distribution being distributed to the target pixel;

a target-pixel weighting unit for weighting the original value of the target pixel with the area of its circle of confusion; and an updating unit for accumulating the distributions and the weighted value of the target pixel to yield a mean value, the original value of the target pixel being updated by the mean value.

6. The apparatus of claim 5, wherein the distributing unit includes a reference-pixel weighting unit for multiplying a value of each reference pixel by a reciprocal of an area of their respective circles of confusion.

7. The apparatus of claim 5, wherein the checking means further includes:

a spatial-location comparing unit for comparing Z values of the target pixel and the reference pixels, the Z value representing a distance from the view point to their corresponding points, and wherein the image defocusing apparatus further comprising:

means for disallowing the updating means to update the original value of the target pixel when the reference pixel has a larger Z value than the target pixel.

8. The apparatus of claim 5, wherein the checking means further includes:

an output unit for comparing the Z values of the target pixel and the neighboring pixels to select a neighboring pixel whose Z value is smaller than the target pixel, and for subsequently outputting the selected neighboring pixel to the distance computing unit, the Z value representing a distance from the view point to their corresponding points.

9. An image defocusing apparatus for defocusing an image formed on a screen by modeling an object in a boundary box by updating pixel values on the image to approximate a video camera lens' focusing effects, the apparatus comprising:

setting means for a position of the video camera lens in virtual space;

input means for inputting from the video camera a distance from a viewpoint to a focal point of the video camera lens, an iris value of the lens and a focal position;

means for computing data relating to a circle of confusion for each point in the boundary box based on the input values inputted from the input means and a set position set by the setting means, the circle of confusion being a measure of how defocused an out-of-focus point is to be displayed on the screen;

means for storing the computed data of a circle of confusion of each point;

a first checking means for checking a first reference pixel whose corresponding point's circle of confusion overlaps a target pixel in a first direction;

a first updating means for updating an original value of the target pixel by taking into account a value of the first reference pixel and the data related to the target pixel's circle of confusion;

a second checking means for checking a second reference pixel whose corresponding point's circle of confusion overlaps the target pixel in a second direction, the second direction being orthogonal with respect to the first direction;

a second updating means for updating the values updated by the first updating unit by taking into account a value of the second reference pixel and the data related to the target pixel's circle of confusion; and means for enabling the display of an image based on the updated values.

10. The apparatus of claim 9, wherein the data related to the circle of confusion comprises a radius and an area of each circle of confusion, and wherein the circle-of-confusion computing means includes:

a radius calculating unit for computing a radius C of each circle of confusion using an expression:

$$C=|1-p(d-f)/d(p-f)|*f/F$$

where p is a distance from a view point to a focal point, d is a Z value that represents a distance from the view point to each point, f is a focal length, and F is an iris value of a lens being used, and wherein the updating means includes:
an area calculating unit for computing an area of each circle of confusion using their respective radiuses C.

11. The apparatus of claim 10, wherein the circle-of-confusion computing means further includes a storage unit for storing the radiuses C of the circles of confusion in relation with their respective pixels' x, y coordinates.

12. The apparatus of claim 11, wherein the first checking means includes:
a first distance computing unit for counting the number of pixels between the target pixel and each pixel aligned in an array that contains the target pixel in the first direction, the number thus counted being a distance;
a first comparing unit for comparing the distance and the radius C relative to each pixel aligned in the target pixel's array in the first direction by referring to their x, y coordinates;
a first comparison-result outputting unit for outputting a pixel aligned in the first direction whose radius is longer than the distance to the first updating means as the first reference pixel, and wherein the second checking means includes:
a second distance computing unit for counting the number of pixels between the target pixel and each pixel aligned in an array that contains the target pixel in the second direction, the number thus counted being a distance;
a second comparing unit for comparing the distance and the radius C relative to each pixel aligned in the target pixel's array in the second direction by referring to their x, y coordinates; and
a second comparison-result outputting unit for outputting a pixel aligned in the second direction whose radius is longer than the distance to the second updating means as the second reference pixel.

13. The apparatus of claim 12, wherein the first updating means includes:
a first distributing unit for weighting a value of the first reference pixel to determine a distribution within their own circles of confusion, the distribution being distributed to the target pixel, and wherein the second updating means includes:
a second distributing unit for weighting a value of the second reference pixel to determine a distribution within their own circles of confusion, the distribution being distributed to the target pixel.

14. The apparatus of claim 13, wherein the first distributing unit includes a first reference-pixel weighting unit for multiplying an original value of each reference pixel by a reciprocal of an area of their respective circles of confusion, and the second distributing unit includes a second reference-pixel weighting unit for multiplying an original value of each reference pixel by a reciprocal of an area of their respective circles of confusion.

15. The apparatus of claim 14, further comprising:
means for withholding the value of the target pixel updated by the first updating means to transfer them to the second updating means.

16. The apparatus of claim 13, wherein the first checking means includes:

a first spatial-location comparing unit for comparing Z values of the target pixel and the first reference pixel, the Z value representing a distance from the view point to their corresponding points, and wherein the second checking unit includes:
a second spatial-location comparing means for comparing the Z values of the target pixel and the second reference pixel, and wherein the first updating means include:
a first disallowing unit for disallowing the first updating means to update the original value of the target pixel when the target pixel has a smaller Z value, and wherein the second updating means include:
a second disallowing unit for disallowing the second updating means to update the original value of the target pixel when the target pixel has a smaller Z value.

17. The apparatus of claim 13, wherein the first checking means further includes:
a first output unit for comparing the Z values of the target pixel and the neighboring pixels to select a neighboring pixel whose Z value is smaller than the target pixel, and for subsequently outputting the selected neighboring pixel to the first distance computing unit, the Z value representing a distance from the view point to their corresponding points, and wherein the second checking means further includes:
a second output unit for comparing the Z values of the target pixel and the neighboring pixels to select a neighboring pixel whose Z value is smaller than the target pixel, and for subsequently outputting the selected neighboring pixel to the second distance computing unit.

18. A method of defocusing an image by updating pixel values on the image formed on a screen by modeling an object in a boundary box to approximate a video camera lens' focusing effects, the method comprising the steps of:
providing a position of the video camera lens in virtual space;
inputing, relating to the video camera, a distance from a viewpoint to a focal point of the video camera lens, an iris value of the lens and a focal position; boundary box based on the input values inputted and a position of the video camera, the circle of confusion being a measure of how defocused an out-of-focus point is to be displayed on the screen;
storing the computed data of a circle of confusion of each point;
checking a reference pixel whose corresponding point's circle of confusion overlaps a target pixel;
updating an original value of the target pixel by taking into account a value of the reference pixel and the data related to the target pixel's circle of confusion; and
enabling the display of an image based on the updated pixel values.

19. The method of claim 18, wherein the computing step comprises the substep of:
(a) computing a radius C of each circle of confusion using an expression:

$$C=|1-p(d-f)/d(p-f)|*f/F$$

where p is a distance from a view point to a focal point, d is a Z value that represents a distance from the view point to each point, f is a focal length, and F is an iris value of a lens being used.

20. The method of claim 19, wherein the checking step comprises the sub-steps of:

(a) computing a distance from the target pixel to each neighboring pixel;

(b) comparing the distance with a radius C of the overlapping circle of confusion relative to each neighboring pixel;

(c) selecting a neighboring pixel whose radius C is longer than the distance as the reference pixel;

(d) selecting another target pixel; and (e) proceeding the third step when all the pixels on the image have been selected as the target pixel and been through the substeps (a) through (c) of the second step.

21. The method of claim 20, wherein the updating step comprises the substeps of:

(a) weighting a value of each reference pixel to determine a distribution to the target pixel;

(b) computing an area of each overlapping circle of confusion and the target pixel's circle of confusion to weight the original value of the target pixel with the area of its circle of confusion;

(c) accumulating the distributions and the weighted value of the target pixel to yield a mean value, and updating the original value of the target pixel with the mean value;

(d) selecting another target pixel; and (e) terminating to update the target pixel's value when all the pixels have been selected as the target pixel and been through the substeps (a) through (c) of the third step.

22. The method of claim 21 further comprising the steps of:

(4) comparing Z values of the target pixels and neighboring pixels, the Z value representing a distance from a view point to their corresponding points, and (5) disallowing to update the original value of the target pixel when the neighboring pixel has a larger Z value than the target pixel.

23. The method of claim 21, wherein the checking step further comprises the substep of:

(f) comparing Z values of the target pixels and neighboring pixels to select a neighboring pixel whose Z value is smaller than the target pixel prior to the substep (a) of the second step, the Z value representing a distance from a view point to their corresponding points.

24. A method of defocusing an image by updating pixel values on the image formed on a screen by modeling an object in a boundary box to approximate a video camera lens' focusing effects, the method comprising the steps of:

providing a position of the video camera lens in virtual space;

inputing, relative to the video camera, a distance from a viewpoint to a focal point of the video camera lens, an iris value of the lens and a focal position;

computing data related to a circle of confusion for each point in the boundary box based on the input values inputted and a position of the video camera, the circle of confusion being a measure of how defocused an out-of-focus point is to be displayed on the screen;

storing the computed data of a circle of confusion of each point;

checking a first reference pixel whose corresponding point's circle of confusion overlaps a target pixel along a first direction;

updating an original value of the target pixel by taking into account a value of the first reference pixel and the data related to the target pixel's circle of confusion;

checking a second reference pixel whose corresponding point's circle of confusion overlaps the target pixel along a second direction, the second direction being orthogonal with respect to the first direction; and updating the value updated at the third step of the modified first reference pixel by taking into account a value of the second reference pixel and the data related to the target pixel's circle of confusion; and enabling the display of an image based on the updated pixel values.

25. The method of claim 24, wherein the checking of the first and second reference pixels respectively comprises the substep of:

(a) comparing Z values of the target pixels and neighboring pixels, the Z value representing a distance from a view point to their corresponding points, and wherein the updating of the first and reference pixel values respectively comprises the substep of:

(a) disallowing to update the original value of the target pixel when the neighboring pixel has a larger Z value than the target pixel.

26. The method of claim 25, wherein the checking of the first and second reference pixels comprises the substep of:

(b) comparing the Z values of the target pixels and neighboring pixels to select a neighboring pixel whose Z value is smaller than the target pixel prior to the substep (a) of the second step and the substep (a) of the fourth step, respectively.

27. Apparatus for modifying computer generated image data to simulate images having variable focus condition pixels taken through a lens, comprising:

a video camera with a lens for generating image data that can be displayed on a display screen;

means for converting the video images to pixel values;

means for storing the generated image data pixel values;

means for inputting lens data, including a zoom value, iris value, and focal point of a lens system; and defocus processing means for receiving the stored image data pixel values and the lens data and providing desired defocused pixel values to supplement desired in-focus image data pixel values, including:

means for generating a circle of confusion about each corresponding pixel which varies in radius depending on the defocused state desired for out-of-focus points relative to the lens data;

means for defining a target pixel;

means for determining a reference pixel whose corresponding circle of confusion overlaps a target pixel;

means for modifying the value of the target pixel in accordance with the circle of confusion of the target pixel and a value of the reference pixel;

means for operating only on the pixel values that are to be defocused, whereby the in-focus pixel values remain sharply defined and the in-focus image maintains a constant size; and buffer means for storing a display image based on the in-focus image data pixel values and defocused pixel values.

28. An image defocusing apparatus for defocusing an image in a first image memory to approximate a lens' focusing effects and storing the defocused image into a second image memory, the image defocusing apparatus being used in an image forming system which also comprises an input apparatus for inputting a view point of a video camera and a screen point at which the image is formed, a computer graphics processing apparatus for forming the image of an object in a boundary box seen from the view point on the screen, the first image memory for storing the image formed on the screen as an original image, and a second image memory for storing an updated image, the image defocusing apparatus comprising:

a circle-of-confusion computing means for computing data related to a circle of confusion for each pixel of the original image by using a zoom value, an iris value, and a focal point, the three values being input relative to the video camera through a reception unit thereof, the circle of confusion being a measure of how defocused an out-of-focus point is on the screen;

a radius-value storage means for storing radius values of the circles of confusion, the radius values being related to the pixels of the original image, and the radius values being computed by the circle-of-confusion computing means;

a first selecting means for selecting one pixel in the second image memory as a target pixel;

a determining means for checking the radius values in the radius-value storage means and determining reference pixel whose circles of confusion overlap the target pixel;

a pixel-value writing means for weighting the reference pixels and weighting the target pixel, taking into account its circle of confusion, and yielding a mean value from the weighted values, and writing the mean value as the value of the target pixel; and a second selecting means for selecting another pixel among the pixels which do not have their pixel values stored in the second image memory as the target pixel after the value of the present target pixel has been written, and activating the determining means and the pixel-value writing means to operate on the newly-selected pixel as the target pixel.

29. The image defocusing apparatus of claim 28, wherein the data related to the circle of confusion comprises a radius value and a value of an area of each circle of confusion, and wherein the circle-of-confusion computing means includes:

a radius calculating unit for computing a radius C of each circle of confusion using an expression:

$$C = |1 - p(d-f)/d(p-f)| * f/F$$

where p is a distance from a view point to a focal point, d is a Z value that represents a distance from the view point to each point, f is a focal length, and F is an iris value of a lens being used.

30. The image defocusing apparatus of claim 29, wherein the determining means includes:

a distance computing unit for computing a linear distance from the target pixel to each neighboring pixel;

a comparing unit for comparing the linear distance with the radius C relative to each neighboring pixel by referring to their x, y coordinates; and a comparison-result outputting unit for selecting a neighboring pixel whose radius C is longer than the linear distance, and subsequently outputting the selected neighboring pixel as the reference pixel.

31. The image defocusing apparatus of claim 30, wherein the pixel-value writing means includes:

a reference-pixel weighting unit for weighting the reference pixels and adding up the weighted values and the values of the reference pixels;

a target-pixel weighting unit for weighting the target pixel, taking into account its circle of confusion; and a writing unit for yielding a mean value from the output values of the reference-pixel weighting unit and the target-pixel weighting unit, and writing the mean value as the value of the target pixel.

32. The image defocusing apparatus of claim 31, wherein the reference-pixel weighting unit weights each reference pixel by multiplying the value of the reference pixel by a reciprocal of an area of its circle of confusion.

33. The image defocusing apparatus of claim 31, wherein the determining means further includes a spatial-location comparing unit for comparing the Z value of the target pixel with those of the reference pixels, and wherein the image defocusing apparatus further includes a disallowing means for disallowing the pixel-value writing means to write the value of the target pixel when the Z value of the reference pixel is larger than that of the target pixel.

34. The image defocusing apparatus of claim 31, wherein the selecting means further includes an output unit for comparing the Z value of the target pixel with those of the neighboring pixels to select a neighboring pixel whose Z value is smaller than that of the target pixel, and for subsequently outputting the selected neighboring pixel to the distance computing unit.

35. An image defocusing apparatus for defocusing an image in a first image memory to approximate a lens' focusing effects and storing the defocused image into a second image memory, the image defocusing apparatus being used in an image forming system which also comprises an input apparatus for inputting a view point of a video camera and a screen point at which the image is formed, a computer graphics processing apparatus for forming the image of an object in a boundary box seen from the view point on the screen, the first image memory for storing the image formed on the screen as an original image, and the second image memory for storing an updated image, and the image defocusing apparatus comprising:

a circle-of-confusion computing means for computing data related to a circle of confusion for each pixel of the original image by using a zoom value, an iris value, and a focal point, the three values being input relative to the video camera through a reception unit thereof, the circle of confusion being a measure of how defocused an out-of-focus point is on the screen;

a radius-value storage means for storing radius values of the circles of confusion, the radius values being related to the pixels of the original image, and the radius values being computed by the circle-of-confusion computing means;

a first selecting means for selecting one pixel in the second image memory as a target pixel;

a first determining means for checking the radius values in the radius-value storage means for the pixels in a first direction in the first image memory and determining reference pixels whose circles of confusion overlap the target pixel;

a first pixel-value writing means for weighting the first reference pixels selected by the first selecting means and weighting the target pixel, taking into account its circle of confusion, and yielding a mean value from the weighted values, and writing the means value as the value of the target pixel;

a second selecting means for selecting another pixel among the pixels which do not have their pixel values stored in the second image memory as the target pixel after the value of the present target pixel has been written, and activating the first determining means and the first pixel-value writing means to operate on the newly-selected pixel as the target pixel;

a third selecting means for selecting one pixel in the second image memory as the target pixel;

a second determining means for checking the radius values in the radius-value storage means for the pixels in a first direction in the second image memory and determining reference pixels whose circles of confusion overlap the target pixel, the second direction being perpendicular to the first direction;

a second pixel-value writing means for weighting the second reference pixels and weighting the target pixel, taking into account its circle of confusion, and yielding a mean value from the weighted values, and writing the mean value as the value of the target pixel; and a fourth selecting means for selecting another pixel among the pixels which do not have their pixel values in the second image memory as the target pixel after the value of the present target pixel has been written, and activating the second determining means and the second pixel-value writing means to operate on the newly-selected pixel as the target pixel.

36. The image defocusing apparatus of claim 35, wherein the data related to the circle of confusion comprises a radius value and a value of an area of each circle of confusion, and wherein the circle-of-confusion computing means includes:

a radius calculating unit for computing a radius C of each circle of confusion using an expression:

$$C=|1-p(d-f)/d(p-f)|*f/F$$

where p is a distance from a view point to a focal point, d is a Z value that represents a distance from the view point to each point, f is a focal length, and F is an iris value of a lens being used.

37. The image defocusing apparatus of claim 36, wherein the first determining means includes:

a first distance computing unit for counting the number of pixels between the target pixel and each pixel aligned in an array that contains the target pixel in the first direction, the number thus counted being a distance;

a first comparing unit for comparing the distance and the radius C relative to each pixel aligned in the target pixel's array in the first direction by referring to their x, y coordinates;

a first comparison-result outputting unit for outputting a pixel aligned in the first direction whose radius is longer than the distance to the first pixel-value writing means as the first reference pixel, and wherein the second determining means includes:

a second distance computing unit for counting the number of pixels between the target pixel and each pixel aligned in an array that contains the target pixel in the second direction, the number thus counted being a distance;

a second comparing unit for comparing the distance and the radius C relative to each pixel aligned in the target pixel's array in the second direction by referring to their x, y coordinates; and a second comparison-result outputting unit for outputting a pixel aligned in the second direction whose radius is longer than the distance to the second pixel-value writing means as the second reference pixel.

38. The image defocusing apparatus of claim 36, wherein the first pixel-value writing means includes:

a first reference-pixel weighting unit for weighting the reference pixels and adding up the weighted values and the values of the reference pixels;

a first target-pixel weighting unit for weighting the target pixel, taking into account its circle of confusion; and a first writing unit for yielding a mean value from the output values of the first reference-pixel weighting unit and the first target pixel weighting unit, and writing the mean value as the value of the target pixel, and wherein the second pixel-value writing means includes:

a second reference-pixel weighting unit for weighting the reference pixels and adding up the weighted values and the values of the reference pixels;

a second target-pixel weighting unit for weighting the target pixel, taking into account its circle of confusion; and a second writing unit for yielding a means value from the output values of the second reference-pixel weighting unit and the second target-pixel weighting unit, and writing the mean value as the value of the target pixel.

39. The image defocusing apparatus of claim 38, wherein the first reference-pixel weighting unit weights each reference pixel by multiplying the value of the first reference pixel by a reciprocal of an area of its circle of confusion, and wherein the second reference-pixel weighting unit weights each reference pixel by multiplying the value of the second reference pixel by a reciprocal of an area of its circle of confusion.

40. The image defocusing apparatus of claim 38, wherein the first determining means includes:

a first spatial-location comparing unit for comparing the Z value of the target pixel with those of the first reference pixels, and wherein the second selecting means includes:

a second spatial-location comparing unit for comparing the Z value of the target pixel with those of the second reference pixels, and wherein the first pixel-value writing means includes a first disallowing unit for disallowing the first pixel-value writing means to write the mean value as the value of the target pixel when the Z value of the reference pixel is larger than that of the target pixel, and wherein the second pixel-value writing means includes a second disallowing unit for disallowing the second pixel-value writing means to write the mean value as the value of the target pixel when the Z value of the reference pixel is larger than that of the target pixel.

41. The image defocusing apparatus of claim 38, wherein the first determining means and the second determining means respectively further include an output unit for comparing the Z value of the target pixel with those of the neighboring pixels to select a neighboring pixel whose Z value is smaller than that of the target pixel, and for subsequently outputting the selected neighboring pixel to the distance computing unit.

42. An image defocusing method for defocusing an image in a first image memory to approximate a lens' focusing effects and storing the defocused image into a second image memory, the image defocusing method being used in an image forming system which also comprises an input apparatus for inputting information on a view point of a video camera and a point of a screen on which an image is formed, a computer graphics processing apparatus for forming an object in a boundary box seen from the view point on the screen, the first image memory for storing the image formed on the screen as an original image, and the second image memory for storing an updated image, and the image defocusing method comprising the steps of:

(1) computing a radius value of a circle of confusion for each pixel of the original image by using a zoom value, an iris value, and a focal point value, and writing the radius value into a work memory, the radius values being related to the pixels of the original image, the three values being input from the video camera through a reception unit thereof, the circle of confusion being a measure of how defocused an out-of-focus point is on the screen;

(2) sequentially shifting a target pixel in the second image memory;

(3) determining reference pixels whose circles of confusion overlap the target pixel by checking the corresponding radius values; and (4) weighting the reference pixels and weighting the target pixel, taking into account its circle of confusion, and yielding a mean value from the weighted values, and writing the mean value as the value of the target pixel.

43. The method of claim 42, wherein the first step comprises the substep of:

(a) computing a radius C of each circle of confusion using an expression:

$$C=|1-p(d-f)/d(p-f)|*f/F$$

where p is a distance from a view point to a focal point, d is a Z value that represents a distance from the view point to each point, f is a focal length, and F is an iris value of a lens being used.

44. The method of claim 43, wherein the third step comprises the substeps of:

(a) computing a distance from the target pixel to each neighboring pixel;

(b) comparing the distance with a radius C of the overlapping circle of confusion relative to each neighboring pixel; and (c) selecting a neighboring pixel whose radius C is longer than the distance as the reference pixel, and wherein the second step comprises the substeps of:

(d) selecting another target pixel; and (e) proceeding to the fourth step when all the pixels on the image have been selected as the target pixel and been through the substeps (a) through (c) of the third step.

45. The method of claim 44, wherein the third step comprises the substeps of:

(a) weighting the reference pixels and adding up the weighted values and the values of the reference pixels;

(b) weighting the target pixel, taking into account its circle of confusion; and (c) yielding a mean value from steps (a) and (b) and writing the mean value as the value of the target pixel;

(d) selecting another target pixel; and (e) terminating to write the mean value as the value of the target pixel when all the pixels on the image have been selected as the target pixel and been through the substeps (a) through (d) of the fourth step.

46. The method of claim 45, further comprising the steps of:

(5) comparing the Z value of the target pixel with those of the neighboring pixels, the Z value representing a distance from a view point to their corresponding points; and (6) disallowing to write the mean value as the value of the target pixel when the Z value of the neighboring pixel is larger than that of the target pixel.

47. The method of claim 45, wherein the third step further comprises the substep of:

(f) comparing the Z value of the target pixel with those of the neighboring pixels to select a neighboring pixel whose Z value is smaller than that of the target pixel prior to the substep (a) of the third step.

48. An image defocusing method for defocusing an image in a first image memory to approximate a lens' focusing effects and storing the defocused image into a second image memory, the image defocusing method being used in an image forming system which also comprises an input apparatus for inputting information on a view point of a video camera and a point of a screen on which an image is formed, a computer graphics processing apparatus for forming an object in a boundary box seen from the view point on the screen, the first image memory for storing the image formed on the screen as an original image, and a second image memory for storing an updated image, and the image defocusing method comprising the steps of:

(1) computing a radius value of a circle of confusion for each pixel of the original image by using a zoom value, an iris value, and a focal point value, and writing the radius value into a work memory, the radius values being related to the pixels of the original image, the three values being input from the video camera through a reception unit thereof, the circle of confusion being a measure of how defocused an out-of-focus point is on the screen;

(2) sequentially shifting a target pixel in the second image memory;

(3) checking the radius values in the work memory for the pixels in a first direction in the first image memory and determining reference pixels whose circles of confusion overlap the target pixel;

(4) weighting the first reference pixels selected by the first selecting means and weighting the target pixel, taking into account its circle of confusion, and yielding a mean value from the weighted values, and writing the mean value as the value of the target pixel;

(5) checking the radius values in the work memory for the pixels in a first direction in the second image memory and determining reference pixels whose circles of confusion overlap the target pixel, the second direction being perpendicular to the first direction; and (6) weighting the second reference pixels and weighting the target pixel, taking into account its circle of confusion, and yielding a mean value from the weighted values, and writing the mean value as the value of the target pixel.

49. The method of claim 48, wherein the third and fifth steps respectively comprise the substep of:

(a) comparing the Z value of the target pixel with those of the neighboring pixels, the Z value representing a distance from a view point to their corresponding points, and wherein the fourth and sixth steps respectively comprise the substep of:

(a) disallowing to write the mean value as the value of the target pixel when the Z value of the neighboring pixel is larger than that of the target pixel.

50. The method of claim 49, wherein the third and fifth steps further and respectively comprise the substep of:

(b) comparing the Z value of the target pixel with those of the neighboring pixels to select a neighboring pixel whose Z value is smaller than than that of the target pixel prior to the substep (a) of the third step and the substep (a) of the fifth step, respectively.

* * * * *